United States Patent [19]

Maki et al.

[11] Patent Number: 4,882,112
[45] Date of Patent: Nov. 21, 1989

[54] PROCESS FOR PRODUCING SHAPED ARTICLES FROM VEGETABLE PARTICULATE MATERIALS

[75] Inventors: Hirohisa Maki, Neyagawa; Eiichiro Suzuki, Iwata, both of Japan

[73] Assignee: Dai-Ichi Kogyo Seiyaku Co., Ltd., Kyoto, Japan

[21] Appl. No.: 948,169

[22] Filed: Dec. 31, 1986

[51] Int. Cl.⁴ .............................................. B27N 3/08
[52] U.S. Cl. .................................... 264/109; 524/13; 524/14; 524/15; 524/16
[58] Field of Search ........................ 264/109, 122, 123; 524/13, 14, 15, 16

[56] References Cited

U.S. PATENT DOCUMENTS

| | | | |
|---|---|---|---|
| 3,557,263 | 1/1971 | Marra | 264/45 |
| 3,636,199 | 1/1972 | Jenks et al. | 264/134 |
| 4,100,328 | 7/1978 | Gallagher | 428/407 |
| 4,118,354 | 10/1978 | Harada et al. | 260/29.2 |
| 4,143,014 | 3/1979 | McLaughlin et al. | 428/425 |
| 4,486,557 | 12/1984 | Gaul et al. | 523/446 |
| 4,576,771 | 3/1986 | Scholl et al. | 264/109 |
| 4,581,387 | 4/1986 | Werner et al. | 521/128 |
| 4,609,513 | 9/1986 | Isreal | 264/122 |

OTHER PUBLICATIONS

Moslemi, Particleboard, vol. 1, 1974, p. 35.
Hawley, The Condensed Chemical Dictionary, 10th Ed., 1981, p. 840.

Primary Examiner—Jan H. Silbaugh
Assistant Examiner—Mary Lynn Fertig
Attorney, Agent, or Firm—Millen, White & Zelano

[57] ABSTRACT

A process for producing sheets or other shaped articles which includes applying a solution or dispersion of a hydrophilic urethane prepolymer in a large excess of water, optionally containing an inert binder polymer, to vegetable particulate materials, shaping the resulting mass, curing and drying the shaped articles.

10 Claims, 7 Drawing Sheets

PROCESS FOR PRODUCING SHAPED ARTICLES FROM VEGETABLE PARTICULATE MATERIALS

BACKGROUND OF THE INVENTION

This invention relates to a process for producing flexible sheets or other shaped articles from vegetable particulate materials.

Japanese Laid Open Patent Application (Kokai) No. 106932/1984 discloses a process for producing sheets or other shaped articles of vegetable particulate materials bonded together with a binder resin by coating the particulates with isocyanate terminated urethane prepolymers or polyisocyanate compounds and then rolling or otherwise shaping the resultant mass under pressure. The urethane prepolymer or polyisocyanate compound applied to the particulates crosslinks individual particles together through a chemical reaction of the isocyanate group with atmospheric moisture or active sites possessed by the particles. This process requires relatively large amounts of binder prepolymer or compound and is not suited for mass production of inexpensive articles such as planter pots. Furthermore, relatively long curing time and blocking to the mold prevent the process from being applied to mass production of shaped articles on continuous basis.

The process of this invention is distinguished from the prior art in that it provides flexible sheets or articles in a cost effective manner.

SUMMARY OF THE INVENTION

According to the present invention, there is provided a process for producing sheets or other shaped articles comprising the steps of applying to vegetable particulate materials an aqueous mixture containing a urethane prepolymer having a plurality of terminal free isocyanato groups formed by reacting an excess of a polyisocyanate with a polyoxyalkylene polyol having at least two terminal hydroxyl groups per molecule and an oxyethylene unit content of 10 to 90% by weight, said mixture containing a large excess of water; shaping the resulting mass; and curing and drying the resultant articles. The aqueous mixture of said urethane prepolymer may optionally contain an inert binder polymer.

The resultant article may be further compacted under heat and pressure for improving strength properties.

DESCRIPTION OF PREPARED EMBODIMENTS

The urethane prepolymer used in the present invention may be prepared, as is well-known, by reacting an excess of polyisocyanate compound with a polyoxyalkylene polyol having at least two terminal hydroxyl groups per molecule and an oxyethylene unit content of 10 to 90% by weight. The polyol compound, in turn, may be prepared by addition-reacting an alkylene oxide mixture with a starting active hydrogen compound. Examples of starting active hydrogen compounds which must have at least two active hydrogen atoms per molecule include ethylene glycol, propylene glycol, hydroquinone, bisphenol A, 1,6-hexanediol, neopentyl glycol, glycerine, trimethylolpropane, 1,2,6-hexanetriol, pentaerythritol, alpha-methylglycoside, sorbitol, sucrose, castor oil, ethylenediamine, diethylenetriamine, piperazine, methylamine, n-butylamine, aniline, xylylenediamine and the like. Examples of alkylene oxides include ethylene oxide, propylene oxide, butylene oxide, styrene oxide, tetrahydrofuran and the like. The proportion of ethylene oxide in the alkylene oxide mixture should be 10 to 90% by weight. The addition-reaction may be performed in known manner. The resulting polyether polyols preferably have a molecular weight greater than 1,000. The oxyethylene units present in each polyoxyalkylene chain may form a random or block copolymer. If the oxyethylene unit content is greater than 90%, e.g. 100%, the polyether polyols often occur as a solid at ambient temperature or urethane prepolymers derived therefrom will cure too rapidly into rigid states. Conversely, if the oxyethylene unit content of the polyether polyols is less than 10%, the urethane prepolymers derived therefrom tend to be less hydrophilic than desirable.

Examples of polyisocyanate compounds include toluylenediisocyanate (purified or crude TDI), disphenylmethanediisocyanate (MDI), polyethylenepolyphenylisocyanate, hexamethylenediisocyanate, xylylenediisocyanate, naphthalenediisocyanate, isophoronediisocyanate, and mixtures thereof.

The urethane prepolymer terminated with free isocyanato groups may be prepared by reacting the polyisocyanate compound and the polyether polyol at an NCO/OH equivalent ratio of 1.5 to 100, preferably 2 to 20. The resulting prepolymer may be easily dissolved or dispersed in a large excess of water optionally together with a binder polymer to form a binder liquid for bonding vegetable particulate materials. Water acts as a chain extender of the urethane prepolymer.

The binder liquid may optionally contain a solution or emulsion of inert binder polymers. Examples of usable water-soluble binder polymers include polyvinyl alcohol, polyacrylic acid, polyacrylamide, water-soluble maleic acid copolymers and the like. Examples of emulsions of binder polymers include natural or synthetic rubber latexes such as natural rubber, SBR, chloroprene rubber, acrylonitrile-butadiene rubber, acrylate-butadiene rubber, isoprene rubber, butyl rubber, ethylene-propylene rubber and the like. Emulsions of other binder polymers such as polyvinyl acetate, polyvinyl chloride, polyvinylidene chloride, vinyl chloridevinyl acetate copolymer, ethylene-vinyl acetate copolymer, polyacrylate, aminoplast and phenol resins may also be used.

The proportion of water in the binder liquid is preferably at least equal to but less than 50 times of the combined solid contents of the urethane prepolymer and the inert binder resin.

Examples of vegetable particulate materials include but not limited to saw dust, wood fragments, cork powder, rice bran, oil meal, soybean meal, rice or other grain hulls, straws, finely divided bark and the like.

In practicing the process of this invention, the binder solution is first applied to vegetable particulate materials such as by spraying. The resultant shaping compound is immediately spread on a mat to form a sheet, allowed to cure at room or an elevated temperature and dried. Alternatively, said compound may be shaped into a desired shape by molding under pressure. Instead of applying the premixed binder liquid, the vegetable particulate materials may be wetted with a large amount of water and then mixed with the remaining components.

The shaping compound may contain other conventional additives such as solvents, plasticizers, defoaming agents, surfactants, coloring agents, fillers, curing catalysts and the like.

The resulting sheets or other shaped articles may be compacted by pressing under heat for further increasing strength properties. This secondary processing is preferably carried out at a pressure of 2 to 100 kg/cm², more preferably 10 to 60 kg/cm² and at a temperature of 70 to 200° C, more preferably 100 to 170° C.

The present invention offers a process for producing valuable sheets and other shaped articles having excellent flexibility and other strength properties starting from waste or less valuable materials in cost effective manner.

The following examples are offered for illustrative purposes only. All parts and percents therein are by weight unless otherwise indicated.

EXAMPLE 1

Preparation of urethane prepolymer

Urethane prepolymer solutions A, B and C shown in Table 1 were prepared by reacting polyalkylene polyols and polyisocyanates listed in Table 1 and diluted with ethyl acetate to 70% concentration. The polyalkylene polyols were synthesized by addition-reacting a mixture of ethylene oxide (EO) and propylene oxide (PO) with a starting compound to form a random copolymer.

TABLE 1

| | Polyalkylene polyol | | | | Polyisocyanate | | | |
|---|---|---|---|---|---|---|---|---|
| Prepolymer | Starting compound | Number of active hydrogen atoms | EO content (%) | Average M.W. | Name | Parts per 100 parts of polyalkylene polyol | NCO/OH equivalent ratio | NCO content |
| A | Glycerine | 3 | 80 | 7,000 | TDI | 16.0 | 4.0 | 5.0 |
| B | Propylene glycol | 2 | 50 | 4,000 | Crude MDI | 38.5 | 5.3 | 7.0 |
| C | Sorbitol | 6 | 70 | 8,000 | Pure MDI | 29.2 | 2.9 | 5.0 |

EXAMPLE 2

10 parts of urethane prepolymer solution A of Example 1 were mixed with 300 parts of water. The mixture was sprayed on 50 parts of sawdust having a moisture content of 15% within 20 seconds. The resulting mass was immediately spread on a flat plate to a thickness of about 8 mm and allowed to cure at 22° C. The curing time was about 3 minutes after spraying. The resulting sheet was dried in a dryer at 80° C. for 3 hours to obtain a flexible sheet having a thickness of about 8 mm. This sheet may be used as directory boards, resilient floor coverings, etc.

EXAMPLE 3

10 parts of a 1:1 mixture of urethane prepolymers A and B of Example 1 were mixed with 357 parts of water. The mixture was sprayed on the same sawdust as used in Example 2 at a ratio of 514 parts per 100 parts of sawdust. After spraying, the sawdust was immediately shaped into a sheet having a thickness of about 1.5 mm, allowed to cure at 22° C. and dried to obtain a thin flexible sheet. This sheet may be used as packaging materials for steel pipes and the like.

EXAMPLE 4

Figure 1:
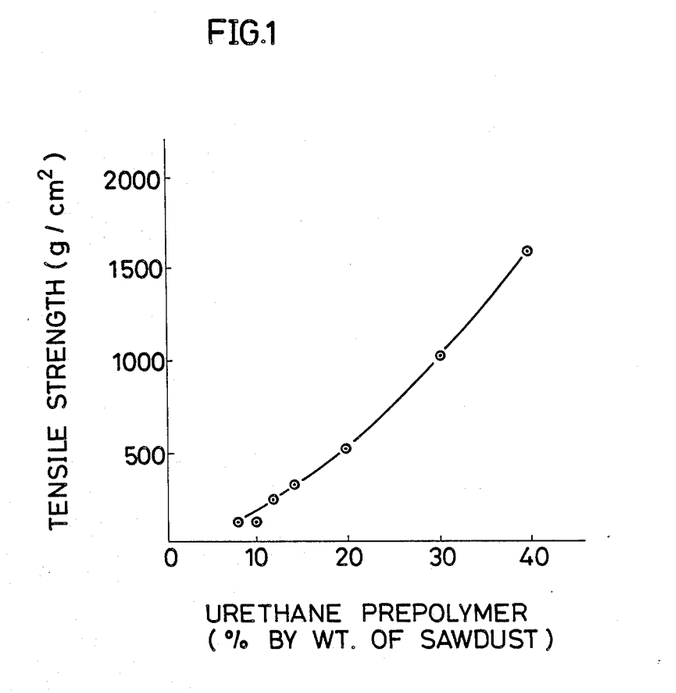

Sawdust of cedar and cypress trees obtained from lumbermills having a moisture content of 5.9% and a particle distribution of 20% of 60 mesh passing, 6.7% of 60–52 mesh passing, 5.3% of 52–48 mesh passing and 68% of 48 mesh retenate was used. Sheets were made as in the preceding examples using 50 parts of this sawdust, 250 parts of water and a varying amount of prepolymer solution C of Example 1 at 4, 5, 6, 7, 10, 15 and 20 parts, respectively, and tested on tensile strength. The results obtained are shown in FIG. 1. The tensile strength was approximately proportional to the amount of urethane prepolymer.

EXAMPLE 5

Figure 2:
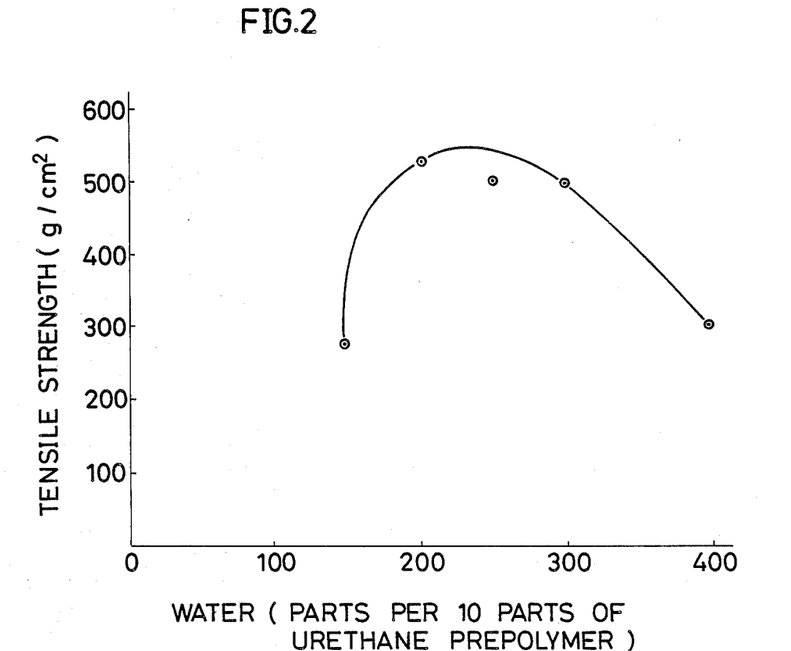

Sheets were made as in Example 4 using 50 parts of sawdust, 10 parts urethane prepolymer solution C and a varying amount of water at 150, 200, 250, 300 and 400 parts, respectively, and tested on tensile strength. The results obtained are shown in FIG. 2. The data indicate that an optimum range of water lies between 200 to 300 parts per 10 parts of urethane prepolymer solution C and the tensile strength decreases if the amount of water is outside this range.

EXAMPLE 6

Figure 3:
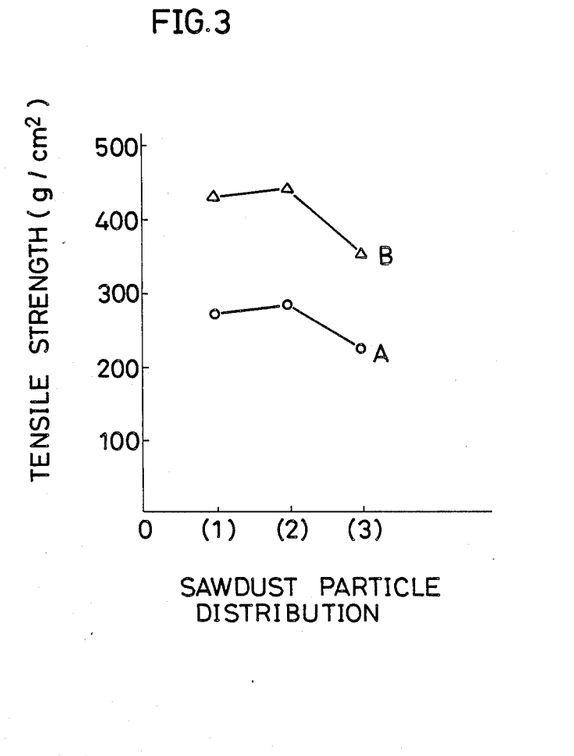

Sheets were made as in Example 4 using 50 parts of sawdust, 250 parts of water and 7 parts (series A) or 10 parts (series B) of urethane prepolymer solution C. Sawdust was used without sieving in run (1). In run (2) and run (3), 60 mesh retenate and 40 mesh retenate were used, respectively. The results obtained are shown in FIG. 3. The data indicate that the particle size distribution of sawdust has little effect on the tensile strength. However, since the sheet made from 40 mesh retenate exhibited a decreased tensile strength, it may be preferable for the sawdust to have relatively wide particle size distributions.

EXAMPLE 7

Figure 4:
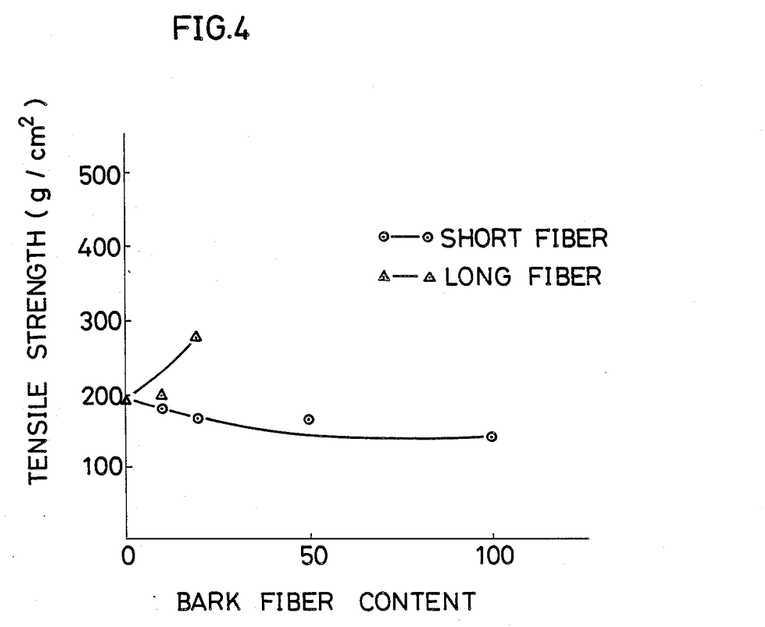

Sheets were made as in Example 4 using 50 parts of sawdust, 7 parts of urethane prepolymer solution C and 250 parts of water, but the sawdust was blended with short fibers (0.5–2 cm) or long fibers (3.0–6.0 cm) of cedar bark at varying proportions. The results obtained are shown in FIG. 4. Short fibers had no effect on the tensile strength which decreased with increase in its proportion. Long fibers had a significant effect on the strength but the fluidity of shaping compound was decreased too much to make a sheet at higher proportions.

EXAMPLE 8

A shaping compound was prepared by spraying a mixture of 5 parts of urethane prepolymer solution C of Example 1 and 250 parts of water onto 50 parts of sawdust used in Example 4. This compound was immediately compression-molded in a mold at a pressure of 45 kg/cm² for 2 minutes, removed from the mold and dried to obtain a planter pot of having a length of 50 mm, a width of 150 mm, a depth of 100 mm and a wall thickness of 10 mm. This planter pot was impermeable to water but permeable to air. Therefore, this pot is more suitable for growing plants than conventional plastic pots.

EXAMPLE 9

355 parts of aqueous mixture of urethane prepolymer used in Example 8 were sprayed on 100 parts of a powdered mixture of sawdust, rice bran, oil meal, soybean meal and poultry feces. The resulting compound was immediately compression-molded at a pressure of 35 kg/cm$^2$, removed from the mold and dried to obtain a planter pot. This pot is particularly useful for agricultural purposes because when seedlings grown in this pot are transplanted as such, the pot is decomposed by the action of water in the soil to a fertilizer.

EXAMPLE 10

100 parts of a mixture of oak sawdust (Q. rerrata, Q. acutissima etc.) and rice bran containing a small amount of Shiitake hypha (Lentinus edodes) were spray-coated with 375 parts of a mixture consisting of 5 parts of urethane prepolymer solution C of Example 1 and 250 parts of water. The resulting compound was compression-molded in a mold into a bar having a length of 150 cm and a square cross section of 10×10 cm$^2$ at a pressure of 42 kg/cm$^2$ for 2 minutes. The shaped bar was removed from the mold and then dried. This bar may be used for culturing Shiitake as a substitute for natural bed logs.

EXAMPLE 11

Figure 5:
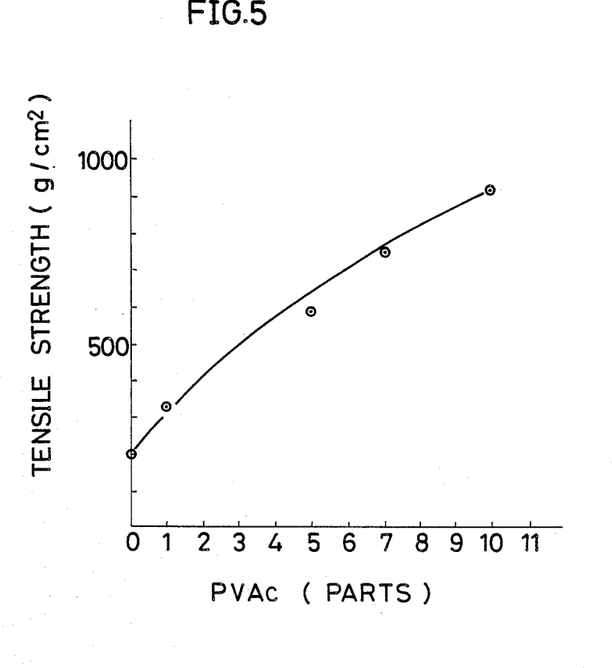

50 parts of sawdust used in Example 4 were spray-coated with a mixture of 7 parts of urethane prepolymer solution C of Example 1 and 250 parts of water containing a varying amount of polyvinyl acetate (PVAc) emulsion (41% nonvolatile) at 0, 1, 5, 7 and 10 parts, respectively. Sheets were made from respective compounds, dried and tested on the tensile strength. The results obtained are shown in FIG. 5. The data indicate that the tensile strength may be improved proportionally to the amount of polyvinyl acetate emulsion. However, the sheet becomes more rigid and less flexible with the increase of the amount of polyvinyl acetate emulsion.

EXAMPLE 12

The procedure of Example 11 was repeated except that an ethylene-vinyl acetate copolymer (EVA) emulsion (47% nonvolatile) was replaced for polyvinyl acetate emulsion.

Figure 6:
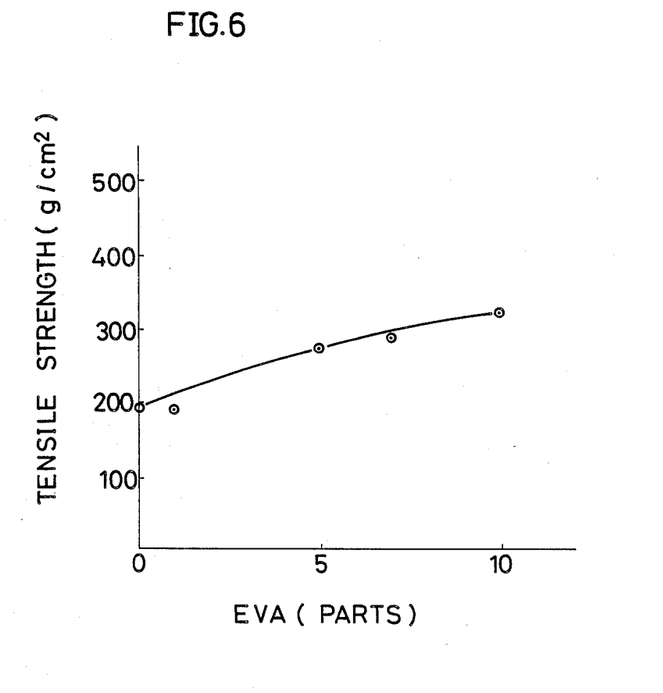

The results obtained are shown in FIG. 6. The effect of EVA emulsion on tensile strength was not so significant as polyvinyl acetate emulsion but the flexibility was retained sufficiently even at higher proportions of EVA emulsion.

EXAMPLE 13

The procedure of Example 11 was repeated except that an emulsion of ethylene-vinyl acetate-vinyl versatate copolymer (50% nonvolatile) was replaced for polyvinyl acetate emulsion.

Figure 7:
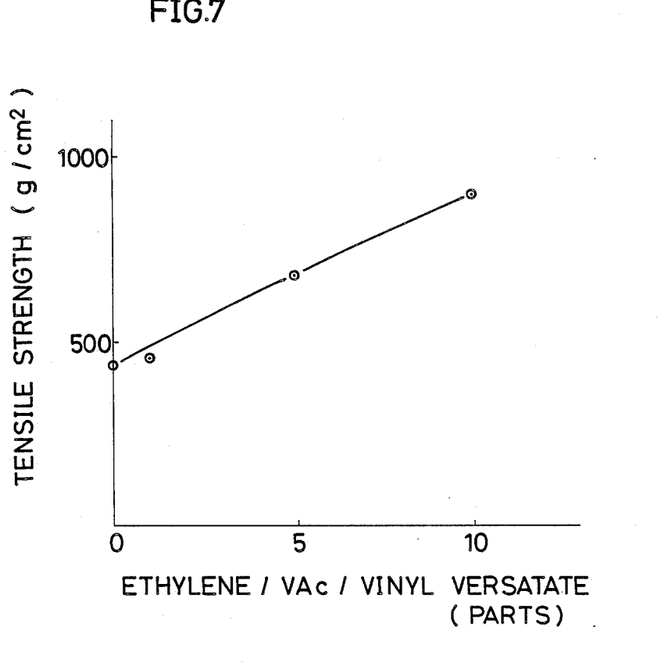

The results obtained are shown in FIG. 7. The effect of addition of ethylene-vinyl acetate-vinyl versatate copolymer emulsion on the strength was between PVAc and EVA emulsions.

EXAMPLE 14

Two shaped sheets obtained in Example 4 at a coating amount of urethane prepolymer solution C of 20% and 30%, respectively, by weight of sawdust were pressed at a pressure of 50 kg/cm$^2$ at 120° C. for 5 minutes. Initial tensile strength values of 530 g/cm$^2$ and 1,100 g/cm$^2$ were increased to 1,050 g/cm$^2$ and 2,020 g/cm$^2$, respectively.

EXAMPLE 15

Two shaped sheets obtained in Example 13 incorporating ethylene-vinyl acetate-vinyl versatate emulsion at 5% and 10%, respectively, were pressed at a pressure of 150 kg/cm$^2$ at 120° C. for 5 minutes. Initial tensile values of 670 g/cm$^2$ and 875 g/cm$^2$ were increased to 1,310 g/cm$^2$ and 1,595 g/cm$^2$, respectively.

EXAMPLE 16

15 parts of urethane prepolymer solution A of Example 1 were mixed with 150 parts of water. The mixture was immediately thoroughly mixed with 100 parts of rice hulls within 20 seconds. The resulting mass was spread in a mold frame to a thickness of about 20 mm and allowed to cure at 22° C. Curing was completed in 3 minutes after mixing the prepolymer with water.

After standing 24 hours, the resulting sheet was pressed at a pressure of 20 kg/cm$^2$ at 100° C. for one minutes to give a resilient sheet having a thickness of 10 mm, a density of 0.50 g/cm$^3$ and a flexural strength of 28 kg/cm$^2$.

We claim:

1. In a process for preparing sheets or other shaped articles comprising the steps of applying a binder composition to vegetable particulate materials, shaping the resulting mass, and curing the resulting shaped articles, the improvement wherein said binder composition consists essentially of an aqueous mixture of (a) at least 8% by weight of said vegetable particulate materials of a urethane prepolymer having a plurality of terminal free isocyanato groups formed by reacting an excess of a polyisocyanate with a polyalkylene polyol having at least two terminal hydroxyl groups per molecule and an oxyethylene unit content of 10 to 90% by weight; (b) an aqueous solution or emulsion of an inert binder polymer selected from the group consisting of polyvinyl acetate, ethylene vinyl acetate copolymer and ethylene vinyl acetate vinyl versatate copolymer; and (c) at least equal parts by weight of the solid content of said binder composition of water; and wherein said shaped articles are subjected to drying to reduce their water content subsequent to said curing step.

2. The process as claimed in claim 1, wherein the amount of said urethane prepolymer ranges from 8 to 40% by weight of said vegetable particulate materials.

3. The process as claimed in claim 1, wherein the amount of water in said aqueous mixture of urethane prepolymer is at least equal to but less than 50 times that of the solid content of said aqueous mixture.

4. The process as claimed in claim 1, wherein said vegetable particulate materials are sawdust, wood fragments, cork powder, rice bran, oil means, soybean meal, rice or other grain hulls, straws or finely divided bark.

5. The process as claimed in claim 1, wherein said shaping step includes compression molding.

6. The process as claimed in claim 1 further including the step of compacting the resultant shaped articles under heat and pressure.

7. The process as claimed in claim 6, wherein said compacting step is carried out at a temperature of 70 to 200° C. and a pressure of 2 to 200 kg/cm$^2$.

8. The process as claimed in claim 1, wherein said vegetable particulate materials are sawdust, wood fragments, cork powder, rice bran, oil meal, soybean meal, rice or other grain hulls, straws or finely divided bark; wherein the amount of said urethane prepolymer ranges from 8 to 40% by weight of said vegetable particulate materials; wherein the amount of water in said aqueous mixture of urethane prepolymer is at least equal to but less than 50 times that of the solid content of said aqueous mixture; wherein said shaping step includes compression molding; and wherein the process includes the step of compacting the resultant shaped articles under heat and pressure.

9. The process according to claim 8, wherein said particulate material is sawdust.

10. The process according to claim 1 wherein said particulate material is sawdust.

* * * * *